(No Model.)
G. GUILD.
APPARATUS FOR TREATING PHOSPHATE ROCK.
No. 512,958. Patented Jan. 16, 1894.
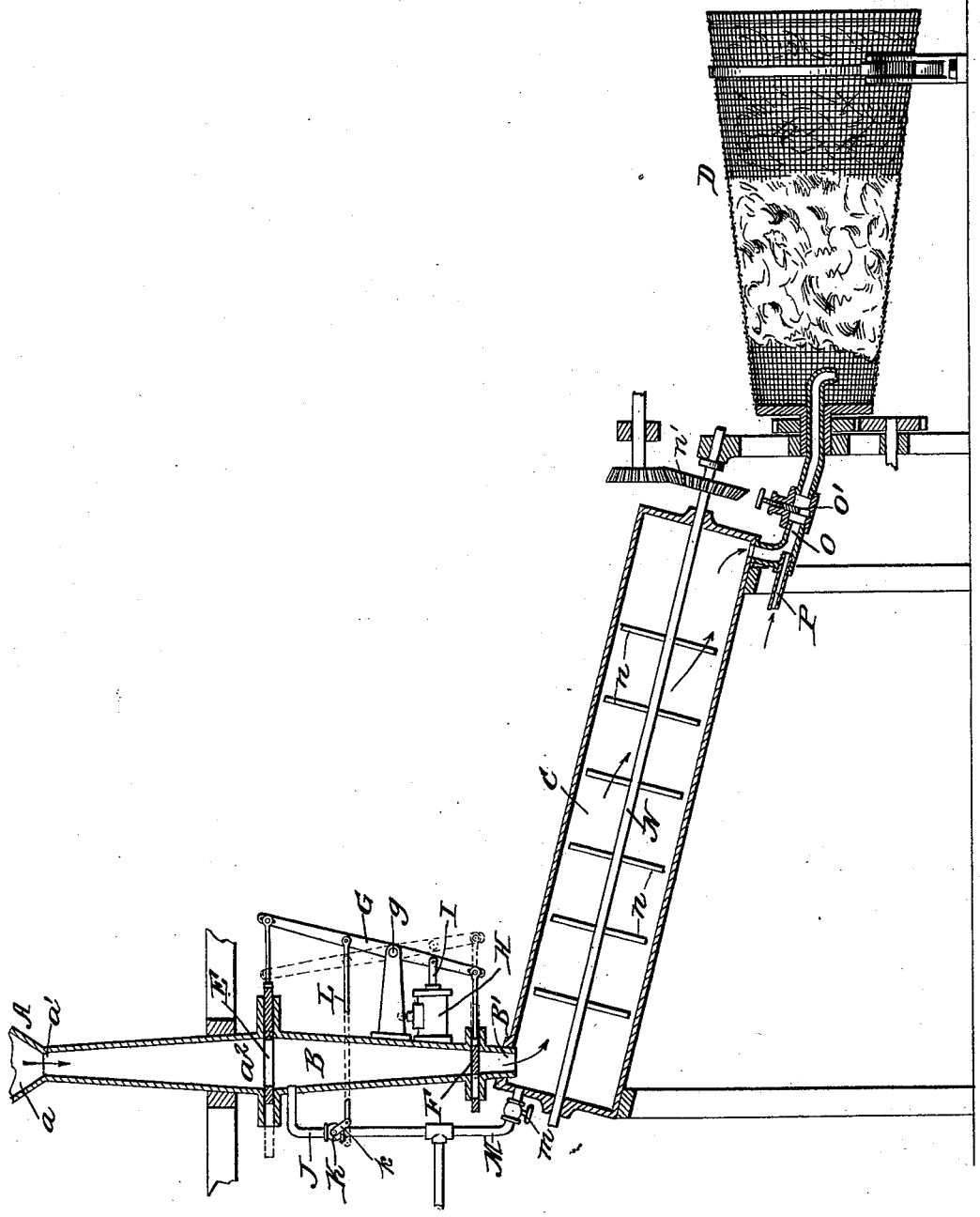
WITNESSES:
Fred G. Dieterich
P. B. Turpin.
INVENTOR:
George Guild.
BY Munn & Co
ATTORNEYS
THE NATIONAL LITHOGRAPHING COMPANY,
WASHINGTON, D. C.

UNITED STATES PATENT OFFICE.

GEORGE GUILD, OF KNOXVILLE, TENNESSEE, ASSIGNOR OF TWO-THIRDS TO E. W. CODINGTON AND C. GUSTAVUS MEMMINGER, OF BARTOW, FLORIDA.

APPARATUS FOR TREATING PHOSPHATE ROCK.

SPECIFICATION forming part of Letters Patent No. 512,958, dated January 16, 1894.

Application filed April 29, 1893. Serial No. 472,375. (No model.)

*To all whom it may concern:*

Be it known that I, GEORGE GUILD, of Knoxville, in the county of Knox and State of Tennessee, have invented a new and useful Improvement in Apparatus for Treating Phosphate Rock, of which the following is a specification.

My invention is an improved apparatus for treating phosphate rock comprising means for regulating the supply of material, for steaming the material, means for simultaneously steaming and agitating such material and a separator for screening the phosphate from the mud, &c., and the invention consists in the novel constructions and combinations of parts hereinafter described and claimed.

In the drawing the figure is a sectional elevation of an apparatus embodying my improvement.

My apparatus as shown comprises a hopper A, steaming chamber B, disintegrating chamber C and the screen D. The hopper A has the flaring mouth $a$ contracted slightly at $a'$ and flaring thence gradually outward to its bottom $a^2$ where it communicates with the upper inlet end of the steaming chamber B. This chamber B is largest at its inlet end and is gradually reduced in diameter toward its opposite end where it is smallest, the enlarged inlet and contracted outlet facilitating the free passage of the material into the chamber and causing it to be thoroughly acted upon by the steam before it is discharged into the chamber C. At the inlet and discharge ends of the steaming chamber I provide valves E and F which are connected to the opposite ends of a lever G which is pivoted between its ends at $g$ and operates to open one of the valves as it closes the other so that the valves are operated reciprocally. This lever is operated in both directions of movement by the steam cylinder H whose piston rod I connects with the lever so that the movements of the piston will move the lever in both directions.

A steam pipe J opens into the steaming chamber near its upper end and is provided with a valve K the stem $k$ of which is so connected with the lever G by means of rod L that as such lever is moved to close the valve E the valve K is opened and such valve K is closed as the lever is moved to open valve E and close valve F. This provides for automatically throwing steam into the chamber B when the latter has been charged and its upper valve closed and also cuts off the steam from the said chamber B when its upper valve is opened. The steaming chamber discharges at its lower end into the upper end of the disintegrating chamber through a short nipple or tube B'. The disintegrating chamber inclines downward toward its lower end. Steam is admitted at the upper end of the disintegrating chamber by a pipe M controlled by a valve $m$ so the amount of steam supplied to the chamber C can be conveniently controlled. In the chamber C I journal the stirrer N having the flights $n$ by which the material is stirred and is also fed slowly down the chamber. This stirrer is driven by a suitable driver geared with a pinion $n'$ on the shaft of the stirrer. From the disintegrating chamber C the phosphate, mud, &c., discharge through a tube O into the revolving screen D the tube having a gate valve O' by which the passage of the material is controlled and into the upper end of this pipe O I lead a water pipe P which aids in forcing the water through the pipe O and also in effecting a separation or loosening of the phosphate from the mud, so that as the material is fed into the revolving screen the mud, &c., will be discharged through the screen while the phosphate will be delivered at the end of such screen as will be understood from the figure. The middle portion of the screen D is broken out and the accumulation of mud, &c., therein is illustrated in the broken out portion of the figure.

Manifestly the several parts may be supported in a suitable framing as shown or in any other suitable support as may be desired.

In operation the material is fed into the steaming chamber, and after treatment therein passes into the disintegrating chamber and then into the screen as described.

Having thus described my invention, what I claim as new, and desire to secure by Letters Patent, is—

1. In an apparatus substantially as described the combination of the steaming chamber, its inlet and outlet valves the steam pipe opening into said chamber and provided with a controlling valve, and a lever connected with the inlet and outlet valves of the chamber and also with the controlling valve of the steam pipe whereby the movement of said lever may effect the proper operation of all of the said valves substantially as set forth.

2. In an apparatus substantially as described the combination of the hopper the cylinder B, the inlet and outlet valves the lever connected with and adapted to operate said valves reciprocally and a cylinder and piston whereby to operate said lever substantially as set forth.

3. In an apparatus substantially as described the combination of the chamber B, the steam pipe leading thereto the valve controlling said steam pipe, the valves at the inlet and outlet of the chamber B, a lever connected with and adapted to operate said inlet and outlet valves and a connection between the said lever and the steam valve whereby the latter is controlled by the manipulations of the same lever which operates the inlet and outlet valves all substantially as set forth.

4. In an apparatus substantially as described, the combination of the steaming chamber, the disintegrating chamber having its receiving end connected with the discharge end of the steaming chamber, the screen and connections between the screen and the discharge end of the disintegrating chamber all substantially as set forth.

5. An apparatus for treating phosphate rock comprising the steaming chamber made largest at its inlet end and decreasing toward its discharge end, valves controlling the inlet and discharge of said chamber the hopper connected with the inlet end of the chamber and the steam pipe opening into the chamber at or near its inlet end all substantially as set forth, whereby the material may freely enter the steaming chamber but will be prevented from passing therefrom until it has been thoroughly steamed.

6. In an apparatus for treating phosphate rock the combination of the disintegrating chamber the screen a pipe connecting the discharge end of the chamber with the screen and a water pipe leading into said connecting pipe and in a direction toward the screen all substantially as set forth.

7. The improved apparatus for treating phosphate rock consisting of the hopper, the steaming chamber, the valves controlling the inlet and discharge of such chamber, a pivoted lever connected with and adapted to operate said valves reciprocally, a steam pipe leading into the steaming chamber and having a valve connected with the operating lever, the disintegrating chamber connected at its upper end with the steaming chamber, a steam pipe leading into the disintegrating chamber, the screen, a pipe connecting the disintegrating chamber and the screen, and a water pipe leading into the said connecting pipe all substantially as set forth.

GEORGE GUILD.

Witnesses:
ROBT. E. GUILD,
WALTER S. GUILD.